US012596327B2

(12) United States Patent
Bellippady

(10) Patent No.: US 12,596,327 B2
(45) Date of Patent: Apr. 7, 2026

(54) COMPACT SELF-CONTAINED HOLOGRAPHIC DISPLAY DEVICE

(71) Applicant: Unlocked Reality Inc., San Jose, CA (US)

(72) Inventor: Akash Bellippady, San Jose, CA (US)

( * ) Notice: Subject to any disclaimer, the term of this patent is extended or adjusted under 35 U.S.C. 154(b) by 57 days.

(21) Appl. No.: 18/402,931

(22) Filed: Jan. 3, 2024

(65) Prior Publication Data

US 2024/0288825 A1 Aug. 29, 2024

Related U.S. Application Data

(60) Provisional application No. 63/448,986, filed on Feb. 28, 2023.

(51) Int. Cl.
*G03H 1/22* (2006.01)
*G03H 1/00* (2006.01)
*G03H 1/02* (2006.01)

(52) U.S. Cl.
CPC ....... *G03H 1/22* (2013.01); *G03H 2001/0088* (2013.01); *G03H 2001/0216* (2013.01)

(58) Field of Classification Search
CPC ............. G03H 1/22; G03H 2001/0088; G03H 2001/0216; G09F 19/125; G02B 30/56
See application file for complete search history.

(56) References Cited

U.S. PATENT DOCUMENTS

2017/0322513 A1    11/2017  Zapanta
2018/0059618 A1*    3/2018  Niu ...................... G03H 1/2202
2019/0353906 A1*   11/2019  Gollier ................. G02B 5/3016
2021/0157413 A1*    5/2021  Miller .................. H04N 13/388
2024/0103437 A1*    3/2024  Kim ...................... G03H 1/0005

* cited by examiner

*Primary Examiner* — Nathan J Flynn
*Assistant Examiner* — Christine A Kurien
(74) *Attorney, Agent, or Firm* — Prince Lobal Tye LLP; Brian M. Dingman

(57) ABSTRACT

A holographic media display device with an exterior, including multiple light-emitting displays that each configured to output images, at least one semi-transparent reflector, each reflector configured to receive images from at least one of the displays, to create a hologram display proximate the reflector, control electronics configured to store image media and transmit the image media to the light-emitting displays, and exterior user controls.

15 Claims, 6 Drawing Sheets

COMPACT SELF-CONTAINED HOLOGRAPHIC DISPLAY DEVICE

CROSS-REFERENCE TO RELATED APPLICATION

This application claims priority of Provisional Patent Application No. 63/448,986, filed on Feb. 28, 2023, the entire disclosure of which incorporated herein by reference.

BACKGROUND

This disclosure relates to a holographic display device.

Embodiments described herein relate generally to hologram display systems, and more particularly, to a compact and self-contained holographic media display device that uses multiple displays and one or more reflector(s) to present holographic output based on the Pepper's Ghost effect.

Hologram display devices and systems exist that provide an effect of a hologram. However, existing hologram display devices and systems are not compact or self-contained. Furthermore, existing hologram display devices and systems lack key user controls, such as controls that allow users to control what media they want to display and also allowing those users to manipulate the displayed media via external inputs. Most of the existing hologram devices allow for only a single piece of media from a single display to be displayed and once chosen to be displayed it is cumbersome to modify. Furthermore, some of the existing hologram display devices either require the use of an external display (like a smart phone, TV, or monitor) to display media in addition to the hologram creation device itself. Other than this, some other devices use complex methodologies like projection or advanced electronics. However, these are typically not accessible to most people due to their complexity. Consequently, this lack of simple usability for users of the existing hologram display devices/systems leaves many gaps in user experience and enjoyment or presentation.

SUMMARY

Therefore, what is needed is a device, system and method that accomplish a relatively easy way to showcase multiple holograms by way of a single self-contained unit or device which is user-friendly in its compact design and manufacture and which allows user control via external inputs to modify or manipulate the display of the holographic output.

A novel compact and self-contained holographic media display device, system and method. The device uses multiple displays and one or more reflectors to present one or more holograms. In some embodiments, the compact and self-contained holographic media display device is configured to display holographic output based on user selected media and according to the number and positioning of the reflector(s) between the multiple displays.

In some embodiments, the compact and self-contained holographic media display device comprises a plurality of light-emitting displays, at least one semi-transparent reflector between the displays, control electronics configured to store and load media to use in creating a hologram when displayed on the light-emitting displays, buttons and sensors on an exterior surface to allow for user control, and external inputs that can manipulate the display of the hologram.

All examples and features mentioned below can be combined in any technically possible way.

In one aspect, a holographic media display device with an exterior includes multiple light-emitting displays that each configured to output images, at least one semi-transparent reflector, each reflector configured to receive images from at least one of the displays, to create a hologram display proximate the reflector, control electronics configured to store image media and transmit the image media to the light-emitting displays, and exterior user controls.

Some examples include one of the above and/or below features, or any combination thereof. In an example the holographic media display device further includes a housing that contains at least the light-emitting displays and the at least one reflector. In an example the holographic media display device includes at least two light-emitting displays. In an example at least one of the light-emitting displays is located in a first plane and at least one of the light-emitting displays is located in a second plane that is vertically spaced from the first plane. In an example each light-emitting display comprises at least four different sections and that are each configured to display the same image in a rotational configuration that is different than those of the other three sections. In an example the four sections of the light-emitting display that is located in the first plane are arranged in a rectangular pattern and the four sections of the light-emitting display that is located in the second plane are arranged in a rectangular pattern. In an example the eight light-emitting display sections are arranged in four vertically spaced pairs, where each of the light-emitting display sections located in the second plane is spaced from and directly above a different one of the light-emitting display sections located in the first plane. In an example the holographic media display device includes eight separate semi-transparent reflectors arranged in four pairs. In an example two separate semi-transparent reflectors of a pair of semi-transparent reflectors are located between the light-emitting display sections of each of the four pairs of light-emitting display sections. In an example the holographic media display device includes a single semi-transparent reflector located between and at an angle to the first and second planes.

Some examples include one of the above and/or below features, or any combination thereof. In an example the external inputs comprise one or more sensors. In an example the holographic media display device includes external inputs that are configured to manipulate the display of the hologram. In an example the external inputs comprise one or more sensors. In an example the one or more sensors comprise one or more of a gyroscope, an accelerometer, and a camera.

Some examples include one of the above and/or below features, or any combination thereof. In an example the exterior user controls comprise a button and an on-off switch.

BRIEF DESCRIPTION OF THE DRAWINGS

Various aspects of at least one example are discussed below with reference to the accompanying figures, which are not intended to be drawn to scale. The figures are included to provide illustration and a further understanding of the various aspects and examples and are incorporated in and constitute a part of this specification, but are not intended as a definition of the limits of the inventions. In the figures, identical or nearly identical components illustrated in various figures may be represented by a like reference character or numeral. For purposes of clarity, not every component may be labeled in every figure. In the figures.

DETAILED DESCRIPTION

Figure 1A:
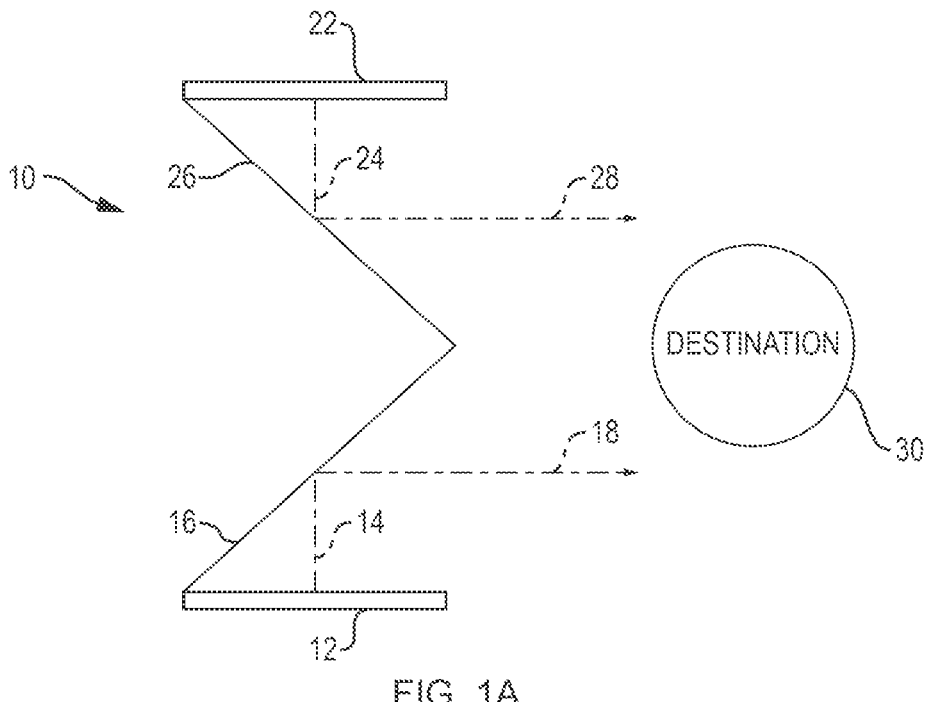
FIG. 1A is partial schematic cross-sectional diagram of displays and reflectors of a compact self-contained holographic display device.

In the following detailed description of the invention, numerous details, examples, and embodiments of the invention are described. However, it will be clear and apparent to one skilled in the art that the invention is not limited to the embodiments set forth and that the invention can be adapted for any of several applications.

Examples of the systems, methods and apparatuses discussed herein are not limited in application to the details of construction and the arrangement of components set forth in the following description or illustrated in the accompanying drawings. The systems, methods and apparatuses are capable of implementation in other examples and of being practiced or of being carried out in various ways. Examples of specific implementations are provided herein for illustrative purposes only and are not intended to be limiting. In particular, functions, components, elements, and features discussed in connection with any one or more examples are not intended to be excluded from a similar role in any other examples.

Examples disclosed herein may be combined with other examples in any manner consistent with at least one of the principles disclosed herein, and references to "an example," "some examples," "an alternate example," "various examples," "one example" or the like are not necessarily mutually exclusive and are intended to indicate that a particular feature, structure, or characteristic described may be included in at least one example. The appearances of such terms herein are not necessarily all referring to the same example.

Also, the phraseology and terminology used herein is for the purpose of description and should not be regarded as limiting. Any references to examples, components, elements, acts, or functions of the computer program products, systems and methods herein referred to in the singular may also embrace embodiments including a plurality, and any references in plural to any example, component, element, act, or function herein may also embrace examples including only a singularity. Accordingly, references in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Elements of figures are shown and described as discrete elements in a block diagram. These may be implemented as one or more of analog circuitry or digital circuitry. Alternatively, or additionally, they may be implemented with one or more microprocessors executing software instructions. The software instructions can include digital signal processing instructions. Operations may be performed by analog circuitry or by a microprocessor executing software that performs the equivalent of the analog operation. Signal lines may be implemented as discrete analog or digital signal lines, as a discrete digital signal line with appropriate signal processing that is able to process separate signals, and/or as elements of a wireless communication system.

When processes are represented or implied in the block diagram, the steps may be performed by one element or a plurality of elements. The steps may be performed together or at different times. The elements that perform the activities may be physically the same or proximate one another or may be physically separate. One element may perform the actions of more than one block.

Examples of the systems, devices and methods described herein comprise computer components and computer-implemented steps that will be apparent to those skilled in the art. For example, it should be understood by one of skill in the art that the computer-implemented steps may be stored as computer-executable instructions on a computer-readable medium such as, for example, floppy disks, hard disks, optical disks, Flash ROMS, nonvolatile ROM, and RAM. Furthermore, it should be understood by one of skill in the art that the computer-executable instructions may be executed on a variety of processors such as, for example, microprocessors, digital signal processors, gate arrays, etc. For ease of exposition, not every step or element of the systems and methods described above is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the disclosure.

Functions, methods, and/or components of the devices, methods and systems disclosed herein according to various aspects and examples may be implemented or carried out in a digital signal processor (DSP) and/or other circuitry, analog or digital, suitable for performing signal processing and other functions in accord with the aspects and examples disclosed herein. Additionally or alternatively, a microprocessor, a logic controller, logic circuits, field programmable gate array(s) (FPGA), application-specific integrated circuits) (ASIC), general computing processor(s), micro-controller(s), and the like, or any combination of these, may be suitable, and may include analog or digital circuit components and/or other components with respect to any particular implementation.

Functions and components disclosed herein may operate in the digital domain, the analog domain, or a combination of the two, and certain examples include analog-to-digital converters) (ADC) and/or digital-to-analog converter(s) (DAC) where appropriate, despite the lack of illustration of ADC's or DAC's in the various figures. Further, functions and components disclosed herein may operate in a time domain, a frequency domain, or a combination of the two, and certain examples include various forms of Fourier or similar analysis, synthesis, and/or transforms to accommodate processing in the various domains.

Any suitable hardware and/or software, including firmware and the like, may be configured to carry out or implement components of the aspects and examples disclosed herein, and various implementations of aspects and examples may include components and/or functionality in addition to those disclosed. Various implementations may include stored instructions for a digital signal processor and/or other circuitry to enable the circuitry, at least in part, to perform the functions described herein.

Some embodiments described herein provide a compact and self-contained holographic media display device that uses multiple displays and one or more semi-transparent reflectors to present one or multiple holograms. In some embodiments, the compact and self-contained holographic media display device is configured to display holographic output based on user selected media and according to the number and positioning of the reflector(s) between the multiple displays. In some embodiments, each reflector is a semi-transparent reflector. In some embodiments, the compact and self-contained holographic media display device produces the holographic output based on the Pepper's Ghost effect.

In some embodiments, the compact and self-contained holographic media display device comprises a plurality of light-emitting displays positioned for a specific outcome, at least one semi-transparent reflector between the plurality of displays, control electronics configured to store and load media to use in creating a hologram when displayed on the light-emitting displays, buttons and sensors on an exterior surface to allow for user control, and external inputs that can manipulate the display of the hologram.

As stated above, the existing hologram display devices and systems are not compact or self-contained and lack key users controls (e.g., controls that allow users to control what media they want to display and also allowing those users to manipulate the displayed media via external inputs, etc.). Additionally, existing hologram devices typically allow for only a single piece of media from a single display to be displayed. After the single media is displayed, the existing hologram devices and systems are ineffective from a user standpoint in modifying the display media. Also, many existing hologram display devices either require the use of an external display like a smart phone, TV, or monitor to be used to display media in addition to the hologram creation device, or other devices use complex methodologies like projection or advanced electronics which are not accessible to most people. Overall, there is a distinct lack of usability for users of the existing hologram display devices/systems hindering user experience, presentation, and enjoyment.

Embodiments of the compact and self-contained holographic media display device described in this specification solve such problems by using the Pepper's Ghost effect to efficiently produce a hologram by way of strategically angled and placed semitransparent reflector(s). Then, by packaging together display electronics and the semi-transparent reflector(s), a self-contained hologram producing device can be made. Utilizing external inputs, like buttons or sensors, and sending that information to the control electronics in the device, users would be able to manipulate the media being displayed as holograms. By utilizing multiple displays in conjunction with semi-transparent reflectors, media can be split between the displays to multiple holograms and/or to create larger composite or combined hologram between semitransparent reflectors.

Embodiments of the compact and self-contained holographic media display device described in this specification differ from and improve upon currently existing options. For instance, to display larger holograms, most existing systems use larger displays and larger semi-transparent reflectors, which does not scale well. Also, since the existing systems typically involve or require the use of an external display (that is, an external display device that is separate from the hologram device), the existing systems fail to provide a consistent and easily accessible way of displaying a hologram. Specifically, to make modifications, the existing systems typically would require loading, or some additional activity to first get the media displaying and then placed within the hologram device. Also, changing the displayed media is difficult in the existing systems. Typically, the existing systems are configured to use only one piece of media at a time.

By contrast, the compact and self-contained holographic media display device uses multiple displays to display one or more holograms and provides a way to combine certain holograms into larger composite or combined holograms in a compact space. By using multiple displays, the compact and self-contained holographic media display device can showcase multiple holograms on different sides of the device or combine holograms into a larger one, all based on the number and positions/angles of semi-transparent reflectors between the displays. The compact and self-contained holographic media display device also allows for external inputs to manipulate holographic media being displayed by the device. Also, by allowing external inputs to modify a packaged system, users do not encounter the limitations or problems of the existing systems.

The compact and self-contained holographic media display device of the present disclosure in one example may be comprised of the following elements. This list of possible constituent elements is intended to be exemplary only and it is not intended that this list be used to limit the compact and self-contained holographic media display device of the present application to just these elements. Persons having ordinary skill in the art relevant to the present disclosure may understand there to be equivalent elements that may be substituted within the present disclosure without changing the essential function or operation of the compact and self-contained holographic media display device: One or more semi-transparent reflector(s); multiple light-emitting displays; control electronics; and one or more external inputs.

The various elements of the compact and self-contained holographic media display device of the present disclosure may be related in the following exemplary fashion. It is not intended to limit the scope or nature of the relationships between the various elements and the following examples are presented as illustrative examples only. The semi-transparent reflectors create a hologram, via the Pepper's Ghost effect, from the media displayed by the light-emitting displays. The media displayed can then be manipulated by interaction with the external inputs. Media is transmitted to the displays via the control electronics of the device.

The compact and self-contained holographic media display device of the present disclosure generally works by way of the semi-transparent reflectors which create a hologram via the Pepper's Ghost effect from the media displayed from the light-emitting displays. The media displayed can then be manipulated by interaction with the external inputs. Media is transmitted to the displays via the control electronics on the device. In other words, a specific shape or a number of semi-transparent reflectors (e.g., acrylic or glass) in a formation (e.g., one or multiple semi-transparent reflector(s) angled at around 45 degrees away from a light-emitting display), reflect some of the light from a displayed media while the remaining passes through, creating a hologram through the Pepper's Ghost effect. By using multiple (two or more) displays (e.g., two displays facing each other) and having multiple semi-transparent reflectors, with each display having semi-transparent reflectors angled from it (e.g., two square pyramids back to back, each point towards a respective display and the back squares aligned) to create holograms, a person could create multiple holograms on each semi-transparent reflector's face (e.g., each face of the square pyramid would display a hologram by reflecting media from their respective display). For example, a person could create a large image by splitting between two displays that are facing each other and create holograms in the same axis. To continue the example, a person can create a device that can house two light-emitting displays and semi-transparent reflectors between them, with control electronics driving what is displayed. The control electronics can transmit media to the light-emitting displays and can be responsive to external inputs (like buttons or sensors) to manipulate what media is displayed (e.g., change or alter what hologram(s) are being displayed).

To make the compact and self-contained holographic media display device of the present disclosure, a person may create a system in which control electronics can take in external inputs (like buttons or sensors) and which can also send media to be displayed on multiple (e.g., two or more) light-emitting displays. The person may then package it in such a way that the displays are facing one-another with semi-transparent reflector(s) between them angled in such a way to produce a hologram(s) that is visible to a viewer (around 45 degrees). If a person wanted to display multiple holograms from a light-emitting display, they could form a square pyramid out of semi-transparent reflectors and position the point to be towards the display to create four viewable holograms, one for each face of the square pyramid. By placing two such sets (a display and square pyramid) and aligning the square portions of the square pyramid back-to-back, the compact and self-contained holographic media display device would create eight viewable holograms. Also, splitting media and combining holograms vertically could allow a person to create a larger hologram in the same area.

The media itself can be stored on the device or externally accessed/streamed and sent/streamed wired or wireless, as long as the device is able to have media to display. The number of semi-transparent reflectors, the formation in which they are placed, and the angle they have from the displays can all be changed. The system may also work with one or more displays as it all depends on the way or how a user wants to create a hologram. In some embodiments, the compact and self-contained holographic media display device creates a compact effect of a hologram based on at least two displays. Displays and semi-transparent reflectors work in conjunction to create holograms, whereby the display emits light in the form of media (like images) to view and the semi-transparent reflector captures some of the light and reflects it at the viewer(s), which has the effect of creating the hologram (that is, being able to see an image and see through to behind the image as well).

To use the compact and self-contained holographic media display device of the present disclosure, a person would likely wish to display holograms of various media images and videos (including real-life images captured by cameras or computer-generated imagery (CGI) created by a user or both, real-life videos, and/or animated videos, etc.). The person may then utilize the compact and self-contained holographic media display device to send or load media on to the device. Once on the device, the person may display the media in hologram form via the compact and self-contained holographic media display device. Then the user would have the option to use the external inputs (like buttons, digital user interfaces, or sensors) on the device to change or manipulate the media being displayed.

FIG. 1A is partial schematic cross-sectional diagram of displays and reflectors 10 of a compact self-contained holographic display device, conceptually illustrating the creation of a hologram. Lower display 12 displays an image, generally along axis 14 that intercepts partially reflective angled surface 16. Reflection 18 can be viewed by a user who is generally located at destination area 30. Similarly, upper display 22 displays an image, generally along axis 24 that intercepts partially reflective angled surface 26. Reflection 28 can be viewed by a user who is generally located at destination area 30. What is viewed is a combination of the images from displays 12 and 22. The partial reflectors allow the user to see through them so that other displayed images (not shown) that can be included in the hologram can also be seen.

Figure 1B:
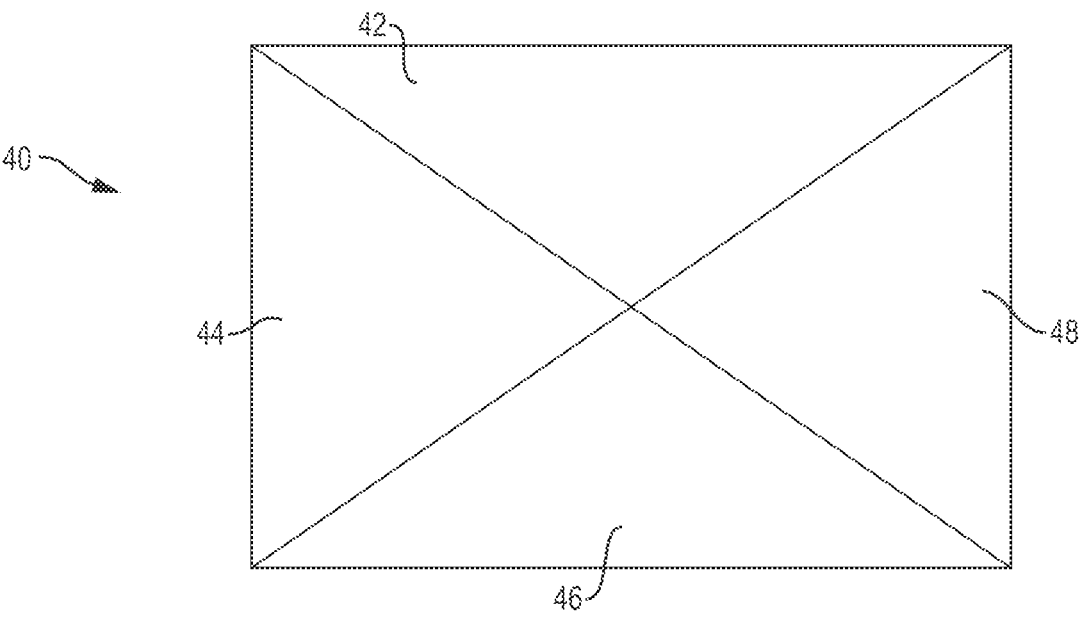
FIG. 1B is a schematic top view of a display with four light-emitting displays.

FIG. 1B is a schematic top view of a display 40 with four co-planar light-emitting display segments 42, 44, 46, and 48 arranged in a rectangular pattern as shown. Note that the display segments need not be triangular as shown but may be, for example, rectangular. Also, the segments do not necessarily entirely fill display 40. Display 40 is designed to be used with a four-sided partially reflective structure, such as shown in FIGS. 3 and 4B and as described elsewhere herein.

Figure 1C:
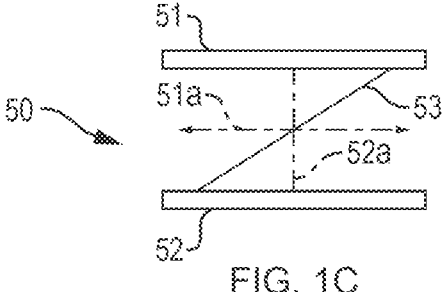
FIG. 1C is partial schematic cross-sectional diagram of displays and reflectors of a compact self-contained holographic display device.

FIG. 1C is partial schematic cross-sectional diagram of displays and reflectors 50 of a different compact self-contained holographic display device with the image visible from two sides rather than four. Display 51 projects along axis 51a toward one side of single angled reflective sheet 53 and is reflected outwardly toward a viewing destination (not shown). Display 52 projects along axis 52a toward the second side of single angled reflective sheet 53 and is reflected outwardly toward a viewing destination (not shown).

Figure 2:
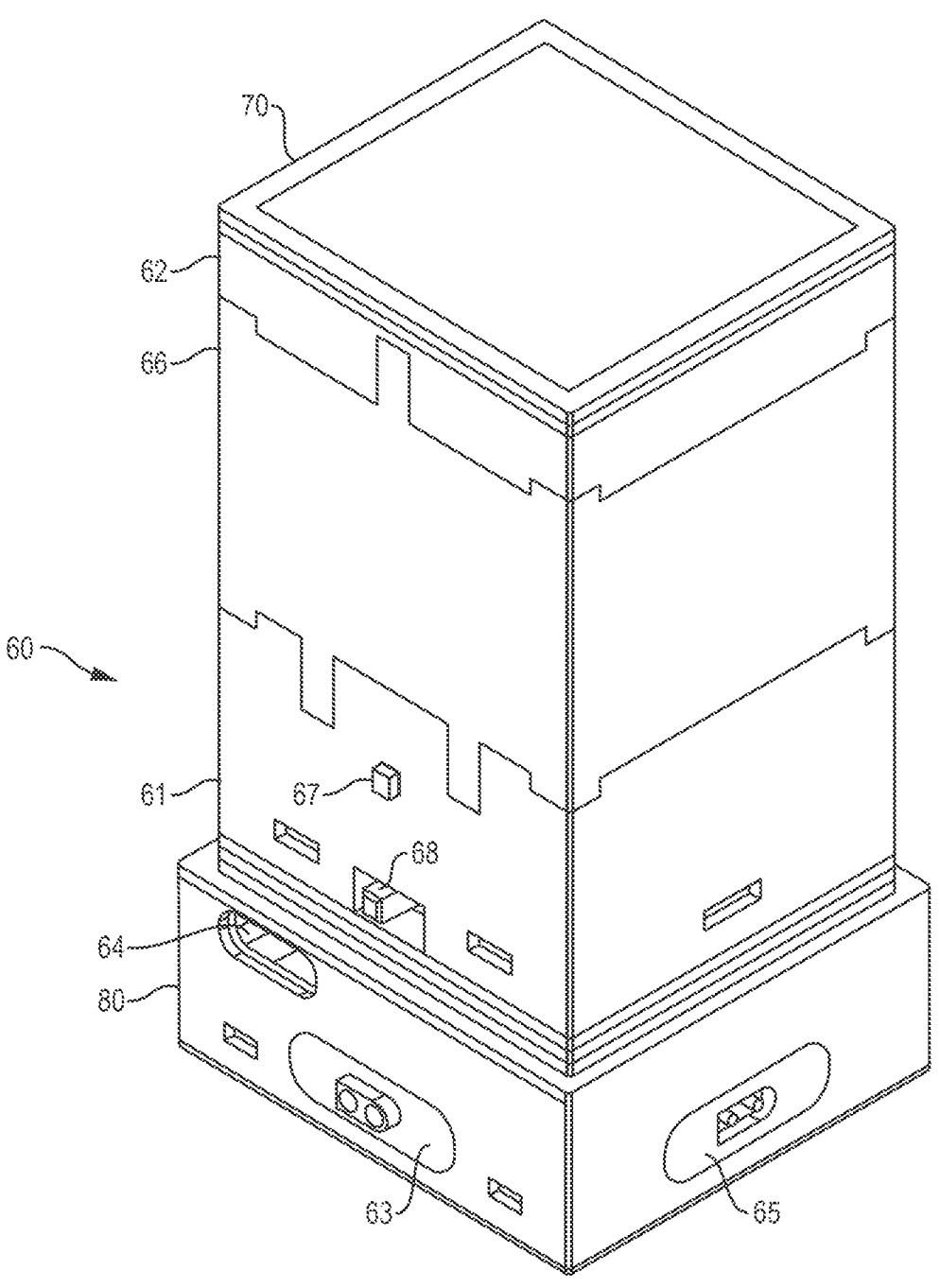
FIG. 2 is a perspective view of a four-sided compact self-contained holographic display device.

FIG. 2 is a perspective view of a four-sided compact self-contained holographic display device 60. Four-sided window 66 is located between top plate 62 (located below top surface 70) and upper base housing 61. Button 67 is a user control that can be used, for example, to switch between multiple hologram displays. Switch 68 is used to turn the device on and off. Male two-pin connector 65 and female connector 63 can be used to connect a battery charger or as inputs from an external device, for example to input images to be displayed. USB Type-C female connector 64 charges the battery 92 in the device when base 80 is connected to holographic display device 60, when a USB Type-C cable is powered and connected to female connector 64. Base 80 can function as a charging base, as explained below.

Figure 3:
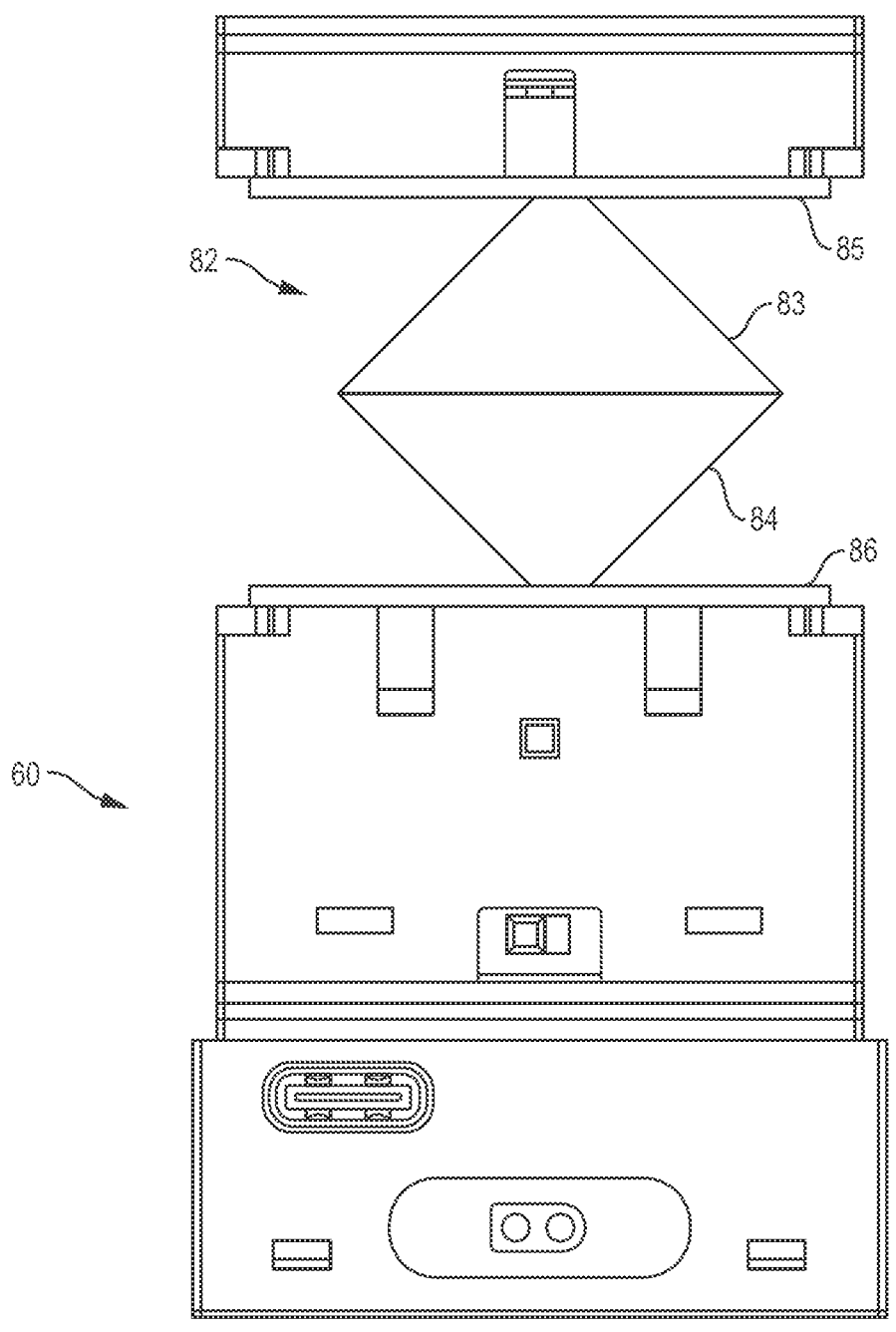
FIG. 3 is a front, partial view of the compact self-contained holographic display device of FIG. 2.
Figures 4A, 4B:
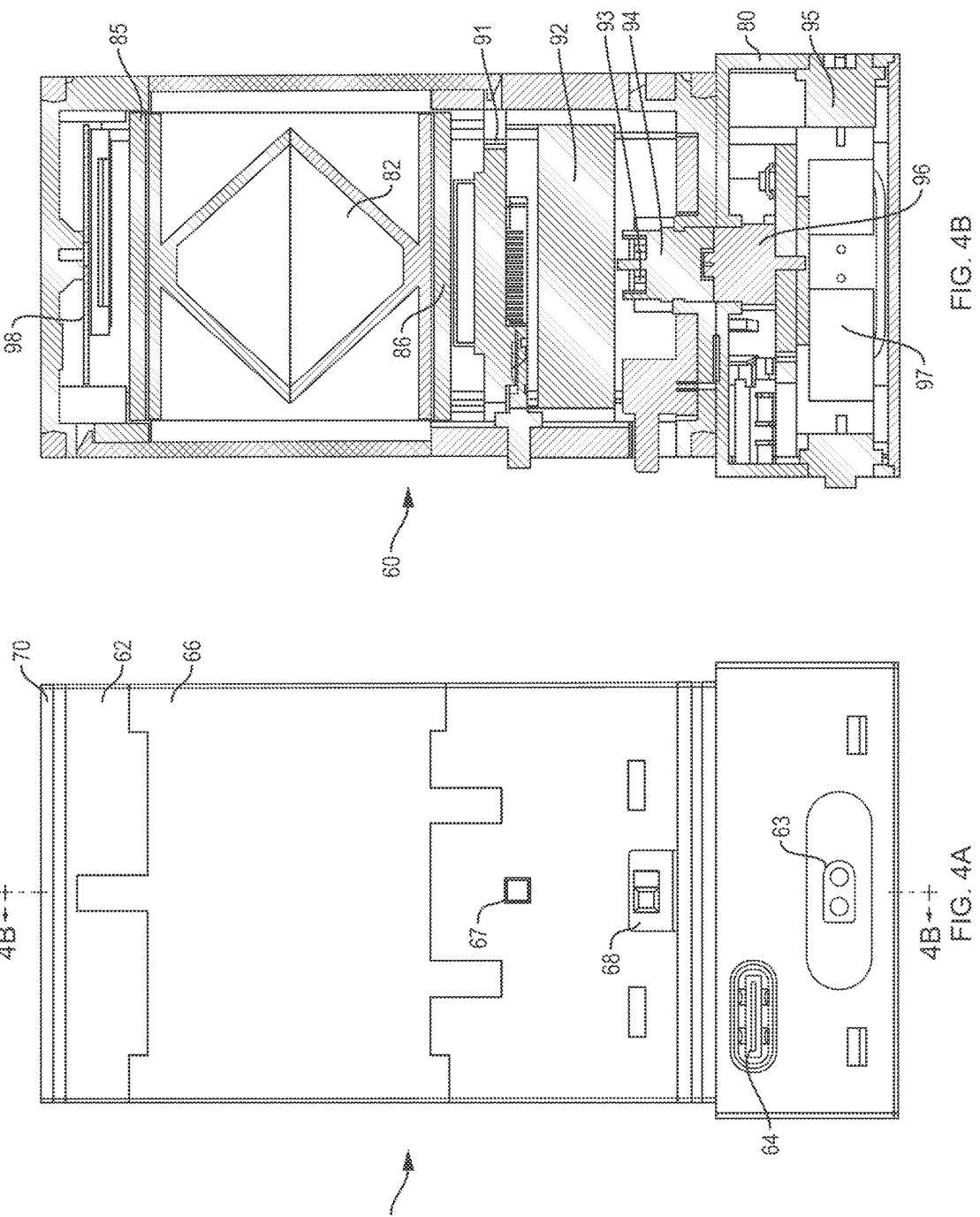
FIG. 4A is a front view of the compact self-contained holographic display device of FIGS. 2 and 3.
FIG. 4B is a cross-section taken along line 4B-4B of FIG. 4A.

FIG. 3 is a front, partial view of a four-sided compact self-contained holographic display device of FIG. 2, but with window 66 removed, to shows lower display device 86, upper display device 85, and double four-sided partially reflective pyramids 83 and 84 that together make up the reflector assembly 82. Each of displays 85 and 86 include four display segments such as shown in FIG. 1B, so that each of the four sides of each pyramid reflects the image from one display segment. The hologram is made up of the combination of the upper and lower images from the vertically aligned display segments. This creates a four-sided hologram that can be seen from each of the four sides of window 66.

FIG. 4A is a front view of the compact self-contained holographic display device 60 of FIGS. 2 and 3, while FIG. 4B is a cross-section taken along line 4B-4B of FIG. 4A. Upper printed circuit board (PCB) 98 is used to control display 85 and main PCB 91 is used to both initially process input images and to control display 86. Each PCB includes controllers that are able to process input images and create the four rotated images that are provided to the four segments of the respective display. Battery 92 is located in base housing 93 and provides power to the display device. Battery 92 is recharged via removable base 80, which includes male power output connector 96 that is supported by internal structure 97. Connector 96 removably mates with female power input connector 94 that is electrically coupled to battery 92. Female input connector 95 is for external recharge power input.

Figure 5:
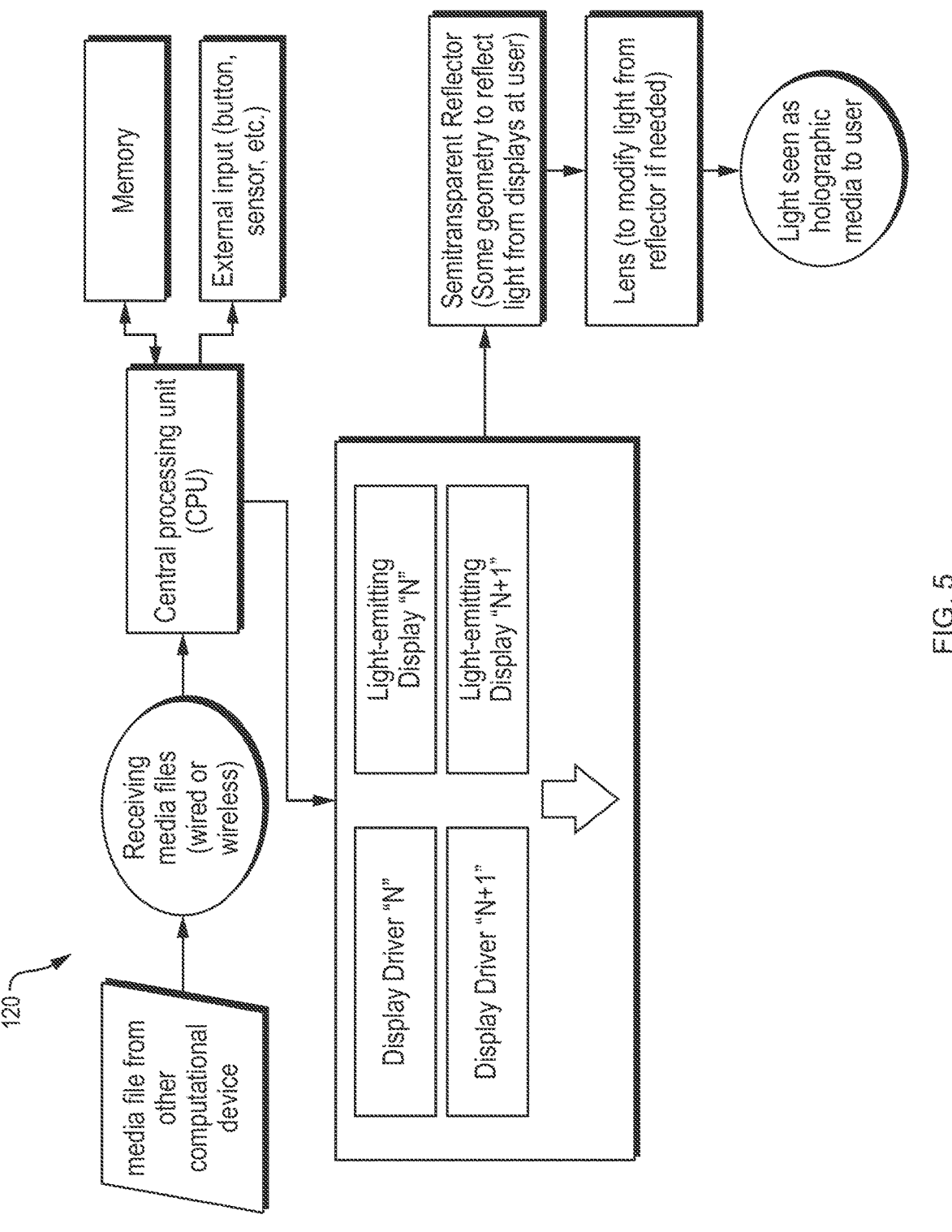
FIG. 5 is a block diagram of a compact self-contained holographic display device.

FIG. 5 is a block diagram of a compact self-contained holographic display device 120. Media files can be received via wires or wirelessly. User control/image control is provided by user controls such as buttons or switches and/or via sensors such as a gyroscope and/or accelerometer. Based on an external input via button or sensor, the internal logic in the device can modify what is being displayed in the device; for example, a button can trigger the device to change to the next set of holograms or a gyroscope can rotate the holograms displayed to create an illusion of a 3d object by changing the image in response to the rotation. Each display segment (LEDs N etc.) is driven by a driver. Lenses can be added to or built into the windows to modify the displays as desired or needed; for example, using a lenticular lens on a displayed hologram may allow for a user to tilt the device to animate the hologram via using this lens's ability to expose different light based on the angle it is viewed.

Figure 6:
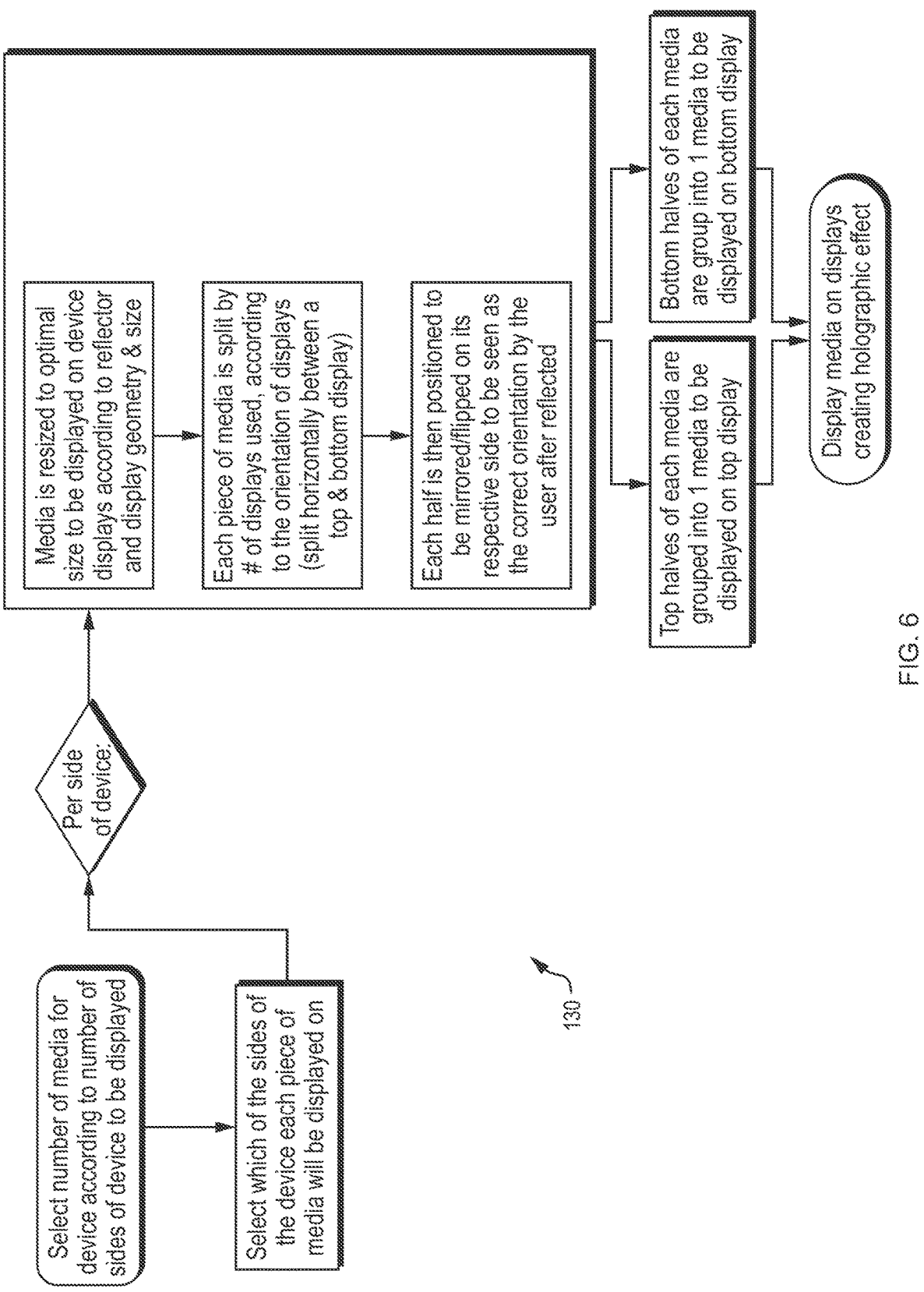
FIG. 6 is an operational diagram of a process to display media on the compact self-contained holographic display device.

FIG. 6 is an operational diagram of a process 130 to display media on the compact self-contained holographic display device. Using an external program via an auxiliary computational device (e.g., a different computer or smartphone) to create the images that will be displayed as holograms, the first two steps of process 130 are done by selecting media available to the auxiliary computational device in their file stores, where the program to create these images exists. Once all the steps to generate the images in process 130 have been completed, the process concludes once they are sent to the hologram display device to be displayed as a hologram.

Having described above several aspects of at least one example, it is to be appreciated that various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A holographic media display device with an exterior, comprising:
   a first light-emitting display arranged in a first plane and configured to output images, and a second light-emitting display arranged in a second plane parallel to and vertically spaced from the first plane and configured to output images;

a stacked double-pyramid semi-transparent reflector assembly disposed between the first and second planes, the reflector assembly having four inclined facets above and four inclined facets below a central plane;
   a housing defining four viewing sides;
   control electronics configured to store image media and drive the first and second light-emitting displays, wherein for each viewing side the control electronics are configured to partition each light-emitting display into a region associated with that viewing side and to render on one light-emitting display a first sub-image portion and on the other light-emitting display a complementary second sub-image portion, such that reflections from the corresponding facets of the reflector assembly spatially register to present a single composite image viewable external to the housing at the viewing side; and
   exterior user controls comprising a momentary button and an on-off switch distinct from the button.

2. The holographic media display device of claim 1 wherein each light-emitting display comprises at least four different sections and that are each configured to display the same image in a rotational configuration that is different than those of the other three sections.

3. The holographic media display device of claim 2 wherein the four sections of the light-emitting display that is located in the first plane are arranged in a rectangular pattern and the four sections of the light-emitting display that is located in the second plane are arranged in a rectangular pattern.

4. The holographic media display device of claim 3 wherein the eight light-emitting display sections are arranged in four vertically-spaced pairs, where each of the light-emitting display sections located in the second plane is spaced from and directly above a different one of the light-emitting display sections located in the first plane.

5. The holographic media display device of claim 4 wherein the reflector assembly comprises eight separate semi-transparent reflectors arranged in four pairs.

6. The holographic media display device of claim 5 wherein two separate semi-transparent reflectors of a pair of semi-transparent reflectors are located between the light-emitting display sections of each of the four pairs of light-emitting display sections.

7. The holographic media display device of claim 1, wherein at least one of the sub-image portions is mirror-reversed prior to display so that the reflected composite appears upright.

8. The device of claim 1, wherein each viewing side presents a different image.

9. The device of claim 1, wherein, for each viewing side, the composite image appears within a rhomboid viewing area determined by the geometry of the pyramid facets.

10. The device of claim 1, wherein each facet has an inclination around 45° relative to the first and second display planes.

11. A holographic media display device comprising:
   a first light emitting display arranged in a first plane and a second light emitting display arranged in a second plane parallel to and vertically spaced from the first plane;
   a single planar semi-transparent reflector disposed between the first and second planes at a fixed oblique angle;
   a housing defining a first viewing side and a second viewing side opposite the first;

control electronics configured to store image media and drive the first and second light emitting displays;

wherein the first light emitting display is associated with the first viewing side and is configured to present an image that, when reflected by the single planar reflector, appears as a full image viewable external to the housing at the first viewing side, and the second light emitting display is associated with the second viewing side and is configured to present an image that, when reflected by the single planar reflector, appears as a full image viewable external to the housing at the second viewing side; and exterior user controls comprising (i) a momentary button and (ii) an on-off switch distinct from the button.

12. The device of claim 11, wherein images presented by the first and second emissive displays are different.

13. The device of claim 11, wherein each image is mirror-reversed prior to display so that the reflected image appears upright at the corresponding viewing side.

14. The device of claim 11, wherein the fixed oblique angle is around 45° relative to the light emitting display planes.

15. A holographic media display device comprising:

a first light-emitting display in a first plane and a second light-emitting display in a second plane parallel to and vertically spaced from the first plane;

a semi-transparent reflector assembly disposed between the first and second planes;

a housing defining a plurality of viewing sides;

wherein the reflector assembly comprises at least one partially reflective component oriented to direct reflections toward the plurality of viewing sides of the housing;

control electronics configured to store image media and drive the displays;

wherein, for each viewing side, the control electronics associate image content for that viewing side with respective portions of at least one of the first and second displays such that, when reflected by the reflector assembly, the image content appears as a single image viewable external to the housing at that viewing side; and an exterior user interface comprising at least one user control.

* * * * *